United States Patent
Shrum, Jr. et al.

(10) Patent No.: US 9,693,110 B2
(45) Date of Patent: Jun. 27, 2017

(54) DYNAMIC CONTENT STREAM MANAGEMENT

(75) Inventors: Edgar V. Shrum, Jr., Atlanta, GA (US); John Civiletto, Suwanee, GA (US)

(73) Assignee: COX COMMUNICATIONS, INC, Atlanta, GA (US)

(*) Notice: Subject to any disclaimer, the term of this patent is extended or adjusted under 35 U.S.C. 154(b) by 690 days.

(21) Appl. No.: 12/792,955

(22) Filed: Jun. 3, 2010

(65) Prior Publication Data

US 2011/0302236 A1    Dec. 8, 2011

(51) Int. Cl.
| | |
|---|---|
| G06F 15/16 | (2006.01) |
| H04N 21/6379 | (2011.01) |
| H04N 21/2343 | (2011.01) |
| H04N 21/258 | (2011.01) |
| H04N 21/472 | (2011.01) |
| H04N 21/647 | (2011.01) |
| H04N 21/658 | (2011.01) |

(52) U.S. Cl.
CPC ..... *H04N 21/6379* (2013.01); *H04N 21/2343* (2013.01); *H04N 21/23439* (2013.01); *H04N 21/25808* (2013.01); *H04N 21/47202* (2013.01); *H04N 21/64738* (2013.01); *H04N 21/64769* (2013.01); *H04N 21/6582* (2013.01)

(58) Field of Classification Search
CPC ......... H04N 21/2343; H04N 21/23439; H04N 21/6379; H04N 21/242; H04L 65/60; H04L 65/607
USPC ...................................................... 709/203
See application file for complete search history.

(56) References Cited

U.S. PATENT DOCUMENTS

| | | | |
|---|---|---|---|
| 6,697,422 B1* | 2/2004 | Mathai | 375/222 |
| 7,770,200 B2* | 8/2010 | Brooks | H04L 41/0896 725/105 |
| 7,831,729 B1* | 11/2010 | Eshet et al. | 709/231 |
| 8,548,056 B2 | 10/2013 | Sagetong et al. | |
| 8,689,275 B2 | 4/2014 | Haywood et al. | |
| 8,700,794 B2 | 4/2014 | Kim et al. | |
| 2003/0135863 A1 | 7/2003 | Van Der Schaar | |
| 2003/0147462 A1* | 8/2003 | Maeda | H04N 19/159 375/240.1 |
| 2004/0071216 A1 | 4/2004 | Richardson et al. | |
| 2005/0041745 A1 | 2/2005 | Zhang et al. | |
| 2005/0246751 A1 | 11/2005 | Boyce et al. | |

(Continued)

OTHER PUBLICATIONS

U.S. Patent Application filed on Mar. 8, 2011 entitled "Transparent Scalable Video Coding,"having U.S. Appl. No. 13/043,207.

(Continued)

*Primary Examiner* — Esther B Henderson
(74) *Attorney, Agent, or Firm* — Merchant & Gould; Steven F. Owens (57) ABSTRACT

Dynamic content stream management of may be provided. A selection of a content element may be received and an encoding scheme may be selected. The content element may be transmitted to the requesting client in the selected encoding scheme. During transmission, a different encoding scheme may be selected according to changing conditions, such as network congestion. The client may be switched over to receive the content element in the new encoding scheme instead of the originally selected encoding scheme.

20 Claims, 5 Drawing Sheets

(56) References Cited

U.S. PATENT DOCUMENTS

| | | |
|---|---|---|
| 2007/0074266 A1 | 3/2007 | Raveendran et al. |
| 2007/0143775 A1 | 6/2007 | Savoor et al. |
| 2007/0200923 A1 | 8/2007 | Eleftheriadis et al. |
| 2008/0043834 A1* | 2/2008 | Lesser et al. .................. 375/240 |
| 2008/0046939 A1* | 2/2008 | Lu et al. .......................... 725/90 |
| 2008/0165850 A1 | 7/2008 | Sagetong et al. |
| 2008/0281803 A1* | 11/2008 | Gentric ............................. 707/5 |
| 2008/0282301 A1 | 11/2008 | Liu et al. |
| 2009/0182789 A1* | 7/2009 | Sandorfi et al. ............... 707/204 |
| 2009/0185619 A1* | 7/2009 | Taleb et al. ............... 375/240.02 |
| 2010/0260254 A1 | 10/2010 | Kimmich et al. |
| 2010/0262712 A1 | 10/2010 | Kim et al. |
| 2010/0312905 A1* | 12/2010 | Sandmann et al. ............ 709/231 |
| 2011/0022492 A1 | 1/2011 | Karaoguz et al. |
| 2011/0126054 A1 | 5/2011 | Hayward et al. |
| 2012/0106612 A1 | 5/2012 | Haywood et al. |
| 2012/0320168 A1 | 12/2012 | Yun et al. |

OTHER PUBLICATIONS

Office Action mailed Feb. 14, 2013, in co-pending U.S. Appl. No. 13/043,207.
Office Action mailed Aug. 19, 2013, in co-pending U.S. Appl. No. 13/043,207.
Office Action mailed Nov. 17, 2014, in co-pending U.S. Appl. No. 13/043,207.
Office Action mailed Apr. 30, 2015, in co-pending U.S. Appl. No. 13/043,207.
Office Action mailed Sep. 28, 2015, in co-pending U.S. Appl. No. 13/043,207.
Office Action mailed Jan. 29, 2016, in co-pending U.S. Appl. No. 13/043,207.
Office Action mailed Jun. 24, 2016, in co-pending U.S. Appl. No. 13/043,207.
Office Action mailed Dec. 22, 2016, in co-pending U.S. Appl. No. 13/043,207.

* cited by examiner

DYNAMIC CONTENT STREAM MANAGEMENT

BACKGROUND

Dynamic content stream management is a process for delivering encoded content over different network and device configurations. In some situations, content delivery may use a pre-selected encoding format that is incapable of adjusting to changes in network characteristics or device capabilities. For example, a low bit rate encoding may be selected at an initiation of content transmission over a network system, but the encoding may not be re-evaluated when the network characteristics (e.g., latency) changes and a higher bit rate may be supported. Furthermore, device capabilities may not be considered when selecting a content encoding to use. For example, in a congested network, all devices receiving content transmissions may receive the same low bit rate encoding without respect to individual latencies or capabilities.

SUMMARY

Consistent with embodiments of the present invention, systems and methods are disclosed for dynamic content stream management. A selection of a content element may be received and an encoding scheme may be selected. The content element may be transmitted to the requesting client in the selected encoding scheme. During transmission, a different encoding scheme may be selected according to changing conditions, such as network congestion. The client may be switched over to receive the content element in the new encoding scheme instead of the originally selected encoding scheme.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

Embodiments of the present invention provide for a method of providing dynamic selection and adjustment of content transmissions. The content transmissions may be selected from various encoded streams, such as different bit rate versions of the same program. The selection and any reselection of one stream over another may be made according to changing network conditions, comparative and/or changing device characteristics and capabilities, and/or content provider policies. For example, subscribers to the content streams may comprise tiered customers, with more expensive tiers receiving higher priority access to higher quality streams.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Consistent with embodiments of the invention, dynamic content stream management may be provided. This stream management may comprise periodically re-evaluating a transmission environment for a content stream such as cable television programming. A service provider may offer channel streams in different encoding schemes that each require different viewing device capabilities to decode and may each require different levels of network and device resources to transmit and view. For example, a network channel stream may be encoded in high, medium, and low bit rate streams. The encoding may be performed prior to transmission, such as for video on demand content, or on the fly and/or as requested by a user, such as for live content.

Upon request for a content stream, various characteristics such as network congestion and receiving device capabilities may be considered to select the most appropriate version of the content stream. Other rules, comprising conditions such as subscription tiers, type of content, event occurrences, etc. may also be considered in the selection of the content stream. For example, a high-definition receiver requesting a premium content stream over a low congestion network may begin receiving the highest bit rate stream while a receiver capable of only displaying standard definition over a similar network and requesting the same content may begin receiving the medium bit rate stream. The periodic re-evaluation of the characteristics and rules may result in changes to the selected stream. For example, if the network begins to become congested, such as where several other users begin requesting content from the same source, some and/or all of the users may begin receiving or may be switched over to a lower bit rate stream. Consistent with embodiments of the invention, different encoded versions of the same content may be aligned in order to establish alignment points at which the different streams are syncronized in time and may be switched between without disrupting the viewing experience of the user (e.g., skipping ahead and/or back from the current point in the viewed stream).

Figure 1:
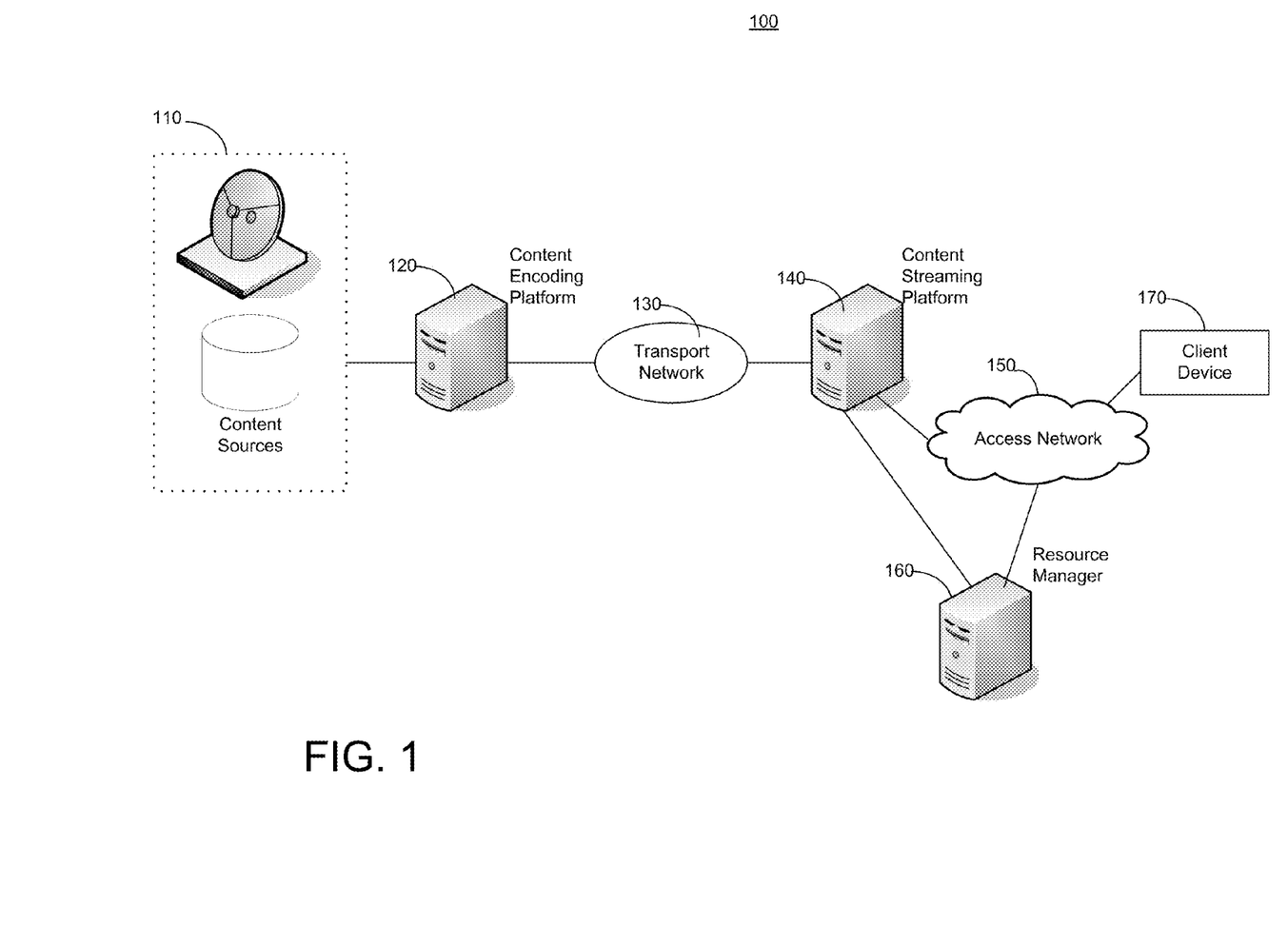
FIG. 1 is a block diagram illustrating an operating environment.

FIG. 1 is simplified block diagram illustrating an operating environment 100 for a media service provider. Operating environment 100 may comprise a plurality of content sources 110, a content encoding platform 120 operative to encode and/or provide a plurality of encoded content streams, a transport network 130, a content streaming platform 140, an access network 150, a resource manager 160, and a client device 170.

Plurality of content sources 110 may comprise, for example, outside content provider sources, such as a satellite link to a television broadcast network, and/or prepared content recordings, such as video on demand content. Content encoding platform 120 may be operative to encode the data of the provided content from plurality of content sources 110 into a format that may be transmitted, received, decoded, and/or displayed by other components of operating environment 100, such as client device 170. Transport network 130 may comprise a content provider's internal network, such as a local area network (LAN). Content streaming platform 140 may be operative to receive content requests and transmit encoded content streams to requesting clients, such as client device 170. Resource manager 160 may be operative to allocate resources, such as processing resources for stream encoding and/or network bandwidth for content stream transmission. Resource manager 160 may also be operative to monitor resource utilization and detect changes. Access network 150 may comprise a private network, such as a cable television distribution network and/or a cellular data network and/or a public network such as a metropolitan WiMAX network and/or the Internet. Client device 170 may comprise, for example, a set-top box operative to request content and receive and decode the associated content stream. Client device 170 may also be operative to provide resource information such as encoding scheme compatibility, CPU and network utilization, and available network bandwidth.

Figure 2:
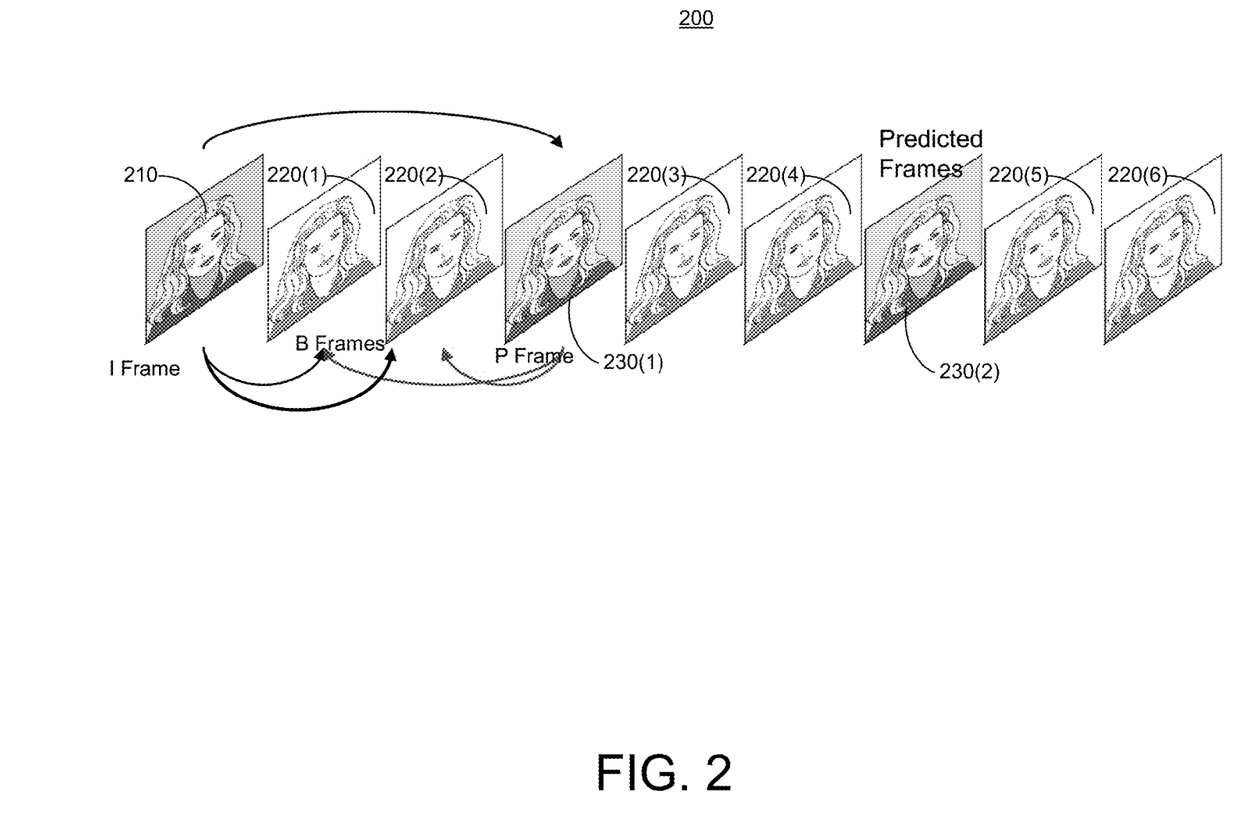
FIG. 2 is an illustration of an example encoding scheme.

FIG. 2 is an illustration of an encoding scheme comprising a Group of Pictures (GOP) interval 200. Such GOP intervals may be used in MPEG-2 and/or MPEG-4 encoding schemes to compress a raw video stream. GOP interval 200 may comprise a number of frames of video, typically 8, 12, or 16 frames per group. GOP interval 200 may comprise a partial group for illustration purposes, and may comprise an intra-coded frame (I-frame) 210, a plurality of bidirectionally-predictive-coded frames (B-frames) 220(1)-220(6), and a plurality of predictive-coded frames (P-frames) 230(1)-230(2). I-frame 210 may comprise a compressed version of a single uncompressed (raw) frame. It may take advantage of spatial redundancy and of the inability of the eye to detect certain changes in the image from a previous frame. Unlike P-frames and B-frames, I-frames may not depend on data in the preceding or the following frames. However, because the compression algorithm may exclude pixel data that may be considered redundant from a previous frame, an I-frame may not include data for every pixel of the frame. Thus, the size of I-frames may vary over the course of a video stream. For example, an I-frame representing part of the same visual scene as the immediately previous frame may be much smaller in size than an I-frame representing an entirely new and different frame.

During compression, the raw frame may be divided into 8 pixel by 8 pixel blocks. The data in each block may be transformed by a discrete cosine transform resulting on an 8 by 8 matrix of coefficients. Block transform is used, for example in H.264 video encoding. The transform may convert spatial variations into frequency variations, but it does not change the information in the block; the original block may be recreated by applying the inverse cosine transform. The frame image may be simplified by quantizing the coefficients and compressing the matrix. Depending on the encoding scheme, every Nth frame is made into an I-frame. P-frames and B-frames might follow an I-frame like this, IBBPBBPBBPBB(I), to form a Group Of Pictures (GOP) interval. The number of frames per interval is variable, and may change over the course of a video stream and/or vary according to a modulation scheme used to transmit the stream. A default GOP size for NTSC modulation may comprise 15, for example, while PAL modulation may comprise a GOP size of 12. A GOP may also end early in order to encode the first frame of a new scene as an I-frame.

P-frames may provide more compression than I-frames because they take advantage of the data in the previous I-frame or P-frame. I-frames and P-frames may be referred to as reference frames, and, consistent with embodiments of the invention, B-frames may also be used as reference frames. To generate a P-frame, the previous reference frame is reconstructed. The frame being compressed may be divided into 16 pixel by 16 pixel macroblocks. Then, for each of those macroblocks, the reconstructed reference frame may be searched to find that 16 by 16 macroblock that best matches the macroblock being compressed. The offset may be encoded as a motion vector. The offset is zero, but, if something in the picture is moving, the offset might be something like 23 pixels to the right and 4 pixels up. If no suitable match is found, the macroblock may be treated like an I-frame macroblock and encoded as a whole. The processing of B-frames is similar to that of P-frames except that B-frames may use the picture in the following reference frame as well as the picture in the preceding reference frame. As a result, B-frames may provide more compression than P-frames.

Video encoding schemes may comprise standards based algorithms such as, but not limited to, CCIR 601, MPEG-1, MPEG-2, MPEG-4, H.261, H.263, H.264, and/or Theora. CCIR 601 is a standard propagated by the International Telecommunication Union—Radiocommunication sector (ITU-R) as Recommendation BT.601-6. MPEG-1 and MPEG-2 are standards propagated by the Motion Picture Experts Group (MPEG). H.261 and H.263 are standards propagated by the International Telecommunication Union Telecommunication Standardization Sector (ITU-T). MPEG-4 and H.264 comprise a standard propagated in partnership by the ITU and the MPEG.

Figure 3:
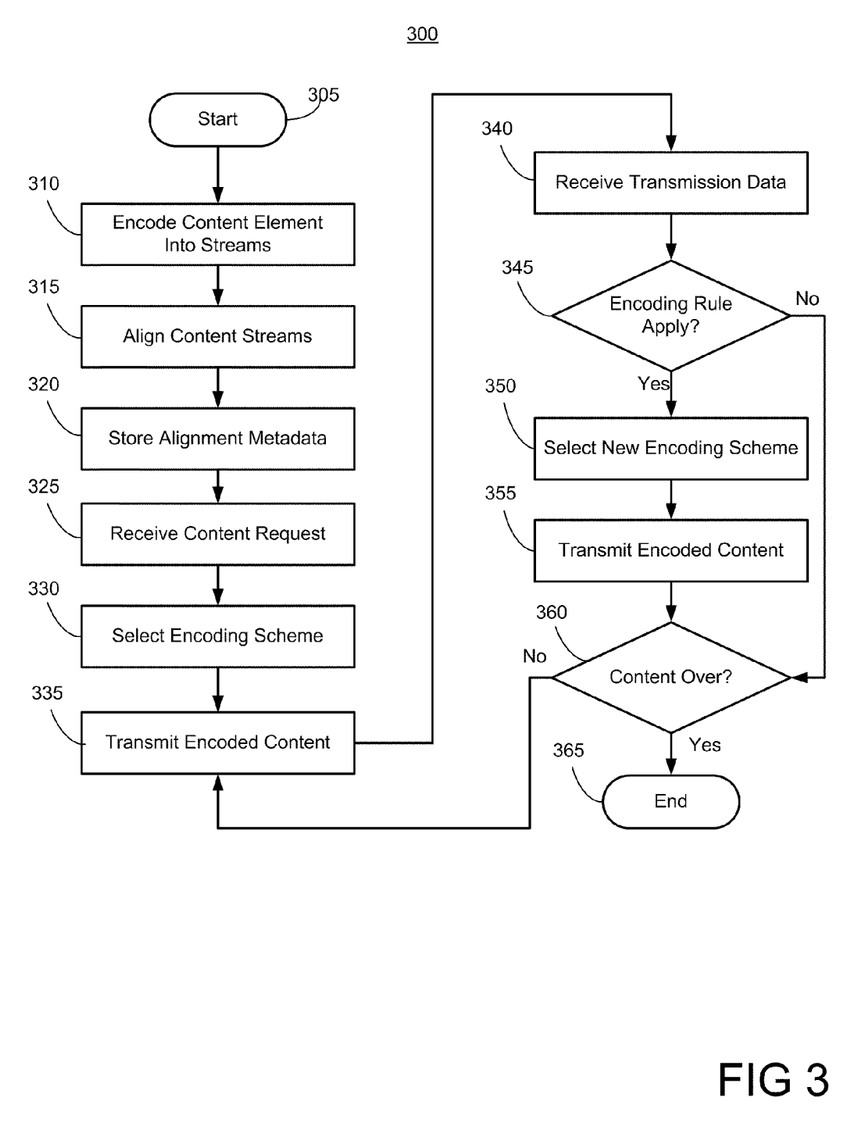
FIG. 3 is a flow chart showing an illustrative routine for providing dynamic content stream management.

FIG. 3 is a flow chart setting forth the general stages involved in a method 300 consistent with embodiments of the invention for providing dynamic content stream management. Method 300 may be implemented using a computing device 500 as described in more detail below with respect to FIG. 5. Ways to implement the stages of method 300 will be described in greater detail below. Method 300 may begin at starting block 305 and proceed to stage 310 where computing device 500 may encode a content element into a plurality of streams. For example, a video on demand content element, such as a movie, may be encoded by content encoding platform 120 into plurality of different bitrate encoded content streams. Encoded elements may also comprise, for example, live broadcast content such as news and/or sporting content programming that may be encoded as it is received from one of plurality of content providers 110.

High, medium, and low bitrate encoded streams of the same content element may comprise variations in resolution and/or frame rates. For example, high bitrate streams may comprise higher resolutions such as 720p (1280×720 pixels), 1080p (1920×1080 pixels) and/or 1080i (1920×1080 pixels). Standard video frame rates for various modulation standards (in parenthesis) may comprise 23.976 Hz (National Television System Committee (NTSC)), 24 Hz (Advanced Television System Committee (ATSC)), 25 Hz (Phase Alternating Line (PAL) and Séquentiel Couleur à Mémoire (SECAM)), 29.97 Hz (NTSC Standard Definition), 50 Hz (PAL and SECAM High Definition), and 60 Hz (ATSC High Definition).

From stage 310, method 300 may advance to stage 315 where computing device 500 may align the content streams. For example, a program encoded into high, medium, and low bitrate streams may comprise a plurality of associated alignment points. The alignment points may comprise a time location within the streams at which the content is synchronized. Each alignment point may comprise, for example, an I-frame within an MPEG-2 encoded stream corresponding to a scene change within a movie content element. The corresponding alignment points in the other encoded content streams may correspond to the same scene change.

From stage 315, method 300 may advance to stage 320 where computing device 500 may format the alignment points as metadata associated with each encoded content stream. For example, content encoding server 120 may store the alignment metadata in a database and/or provide the alignment metadata in association with an on-the-fly or live encoded stream. For stored content, the alignment metadata may be retrieved when client device 170 requests the associated content and may be provided to other components of operating environment 100, such as content streaming platform 140 and/or resource manager 160. For live content, the alignment metadata may be generated as the content stream is encoded in one and/or more versions and transmitted along with the encoded stream(s).

Other metadata associated with the encoded content may comprise content requirements for encoding scheme selection. For example, an advertiser may purchase an upgrade such that their commercial content may have a higher priority for transmission at higher bitrates than other content, or movie type content may be given a similarly higher priority than local access content. Consistent with embodiments of the invention, channel streams within a cable television network may be graded as a criteria for selecting appropriate encoding schemes. For example, a shopping channel may be graded low, a cable news channel may be graded medium, and a premium movie channel may be graded high. These grades may comprise a default rule for selection of low, medium, and high bit rate encoding schemes, respectively, for transmission.

From stage 320, method 300 may advance to stage 325 where computing device 500 may receive a content request. For example, a user of client device 170, which may comprise a set-top terminal coupled to a display device such as a television, may request a video on demand content element and/or select a programming channel in order to view the content element. The request may be transmitted over access network 150, which may comprise a cable television network, to content streaming platform 140 and/or resource manager 160.

From stage 325, method 300 may advance to stage 330 where computing device 500 may select an encoding scheme for transmission of the requested content element. The selection may comprise evaluating a plurality of encoding scheme rules, each comprising a condition and an associated encoding scheme. For example, the encoding scheme rules may comprise conditions associated with decoding capabilities of client device 170 and/or network congestion levels. Thus, if client device 170 is capable of decoding the high, medium, and low bitrate content streams, rules associated with network congestion (e.g., using lower bitrate streams when the network is experiencing heavy use) or other conditions may control. If client device 170 cannot decode, for example, H.264 high definition encoded content streams, the encoding scheme selection will ignore such incompatible schemes.

From stage 330, method 300 may advance to stage 335 where computing device 500 may transmit the encoded content stream. For example, content streaming platform 140 may retrieve the encoded content stream and/or associated metadata from content encoding platform 120 over transport network 130. Content streaming platform 140 may then transmit the encoded content stream over access network 150 to client device 170.

From stage 335, method 300 may advance to stage 340 where computing device 500 may receive transmission data. For example, resource manager 160 may measure network characteristics such as latency and/or available bandwidth and/or the number of client devices receiving content over access network 150. Transmission data may also comprise information associated with client device 170, such as requests for higher or lower bitrates (e.g., client device 170 may request a lower bitrate stream in response to receiving a number of transmission errors and/or dropped packets). Changes in client device 170 may also be received as transmission data, such as a change in a display device being used to output the content stream. For example, client device 170 may comprise a portable device receiving a low bitrate encoded stream before being connected to a large display screen capable of displaying a higher bitrate encoded stream. This information may be supplied over access network 150 as transmission data.

From stage 340, method 300 may advance to stage 345 where computing device 500 may determine whether a new encoding scheme should be used according to the received transmission data. For example, if client device 170 notifies resource manager 160 that a higher bitrate stream decoding and/or output capability is now available, an encoding scheme rule may trigger. Similarly, if network congestion begins to increase, encoding scheme rules associated with transmitting lower bitrate streams may trigger.

If a new encoding scheme is determined to be needed at stage 345, method 300 may advance to stage 350 where computing device 500 may select a new encoding scheme. If an encoding scheme rule triggered in stage 345, content streaming platform 140 may select an encoding scheme according to the triggered rule. For example, if a rule comprising high network congestion as a condition is triggered, content streaming platform may select a lower bitrate encoding scheme.

From stage 350, method 300 may advance to stage 355 where computing device 500 may transmit the content element according to the newly selected encoding scheme. Consistent with embodiments of the invention, content streaming platform 140 may use the alignment metadata associated with the content element to switch from the first encoding scheme to the second encoding scheme at an established alignment point. This may prevent client device 170 from missing and/or repeating portions of the content element.

From stage 355, or if no encoding scheme change was needed at stage 345, method 300 may advance to stage 360 where computing device 500 may determine whether transmission of the content element has completed. If not, method 300 may return to stage 335 where computing device 500 may continue transmission of the content element. Otherwise, method 300 may end at stage 365.

The stages of method 300 described above are intended as non-limiting examples only. Although the method has been described as each being performed by computing device 500, any and/or all of the stages of method 300 may be performed by any and/or all of the modules and elements described in FIGS. 1, 4, and 5. Furthermore, the order of stages is merely an example, and the stages may be performed in any order.

Figure 4:
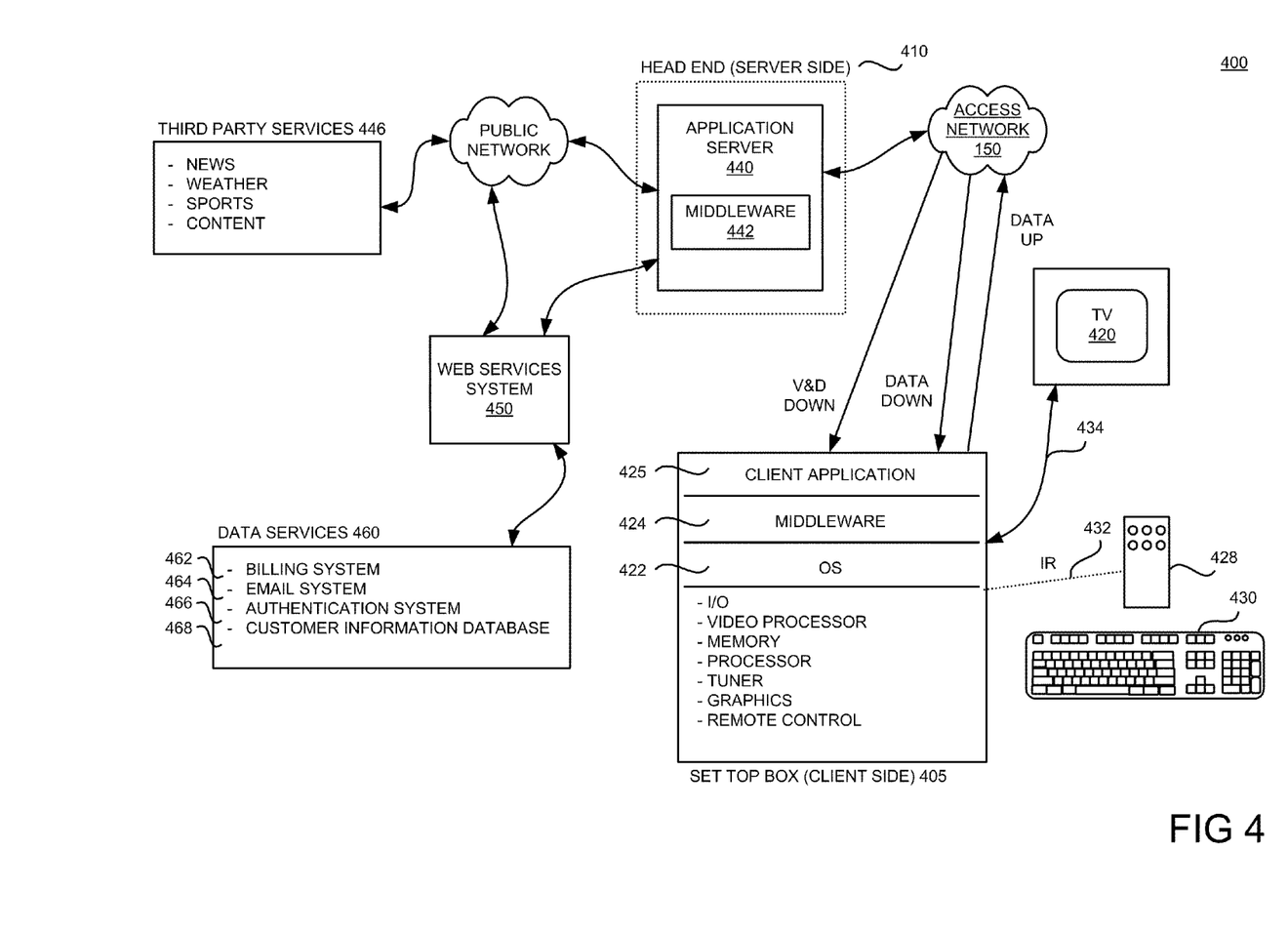
FIG. 4 is a block diagram of a cable television system.

FIG. 4 is a block diagram of a cable television (CATV) system 400 for providing digital and/or analog video programming, information content and interactive television services. These services may be transmitted via access network 150, such as a hybrid fiber coax (HFC) network, to a television set 420 for consumption by a cable television/ services system customer. For example, television set 420 may be located at customer premises 200. Access network 150 may combine both optical fiber and coaxial cable lines. Typically, optical fiber runs from a cable head end 410 to neighborhoods of 500 to 2,000 customers. Coaxial cable runs from the optical fiber feeders to each customer. According to embodiments of the present invention, the functionality of access network 150 allows for efficient bidirectional data flow between a client-side set-top box 405 and a server-side application server 440 of the present invention. Set-top box 405 may comprise a terminal device such as terminal device 155 and/or terminal devices 225(A)-225(C).

CATV system 400 may comprise a distributed client-server computing system for providing video and data flow across access network 150 between server-side services providers (e.g., cable television/services providers) via head end 410 and a client-side customer via client-side set-top box (STB) 405 functionally connected to a customer receiving device, such as television set 420. CATV systems 400 may provide a variety of services across access network 150 including traditional digital and analog video programming, telephone services, high speed Internet access, video-on-demand, and information services.

On the client side of CATV system 400, digital and analog video programming and digital and analog data may be provided to television set 420 via set-top box (STB) 405. Interactive television services that allow a customer to input data to CATV system 400 may likewise be provided by STB 405. As illustrated in FIG. 4, STB 405 may comprise a multipurpose computing device having a computer processor, memory and an input/output mechanism. The input/output mechanism may receive input from server-side processes via access network 150 and from customers via input devices such as a remote control device 428 and a keyboard 430. Remote control device 428 and keyboard 430 may communicate with the STB 405 via a suitable communication transport such as an infrared connection 432. STB 405 may also include a video processor for processing and providing digital and analog video signaling to television set 420 via a cable communication transport 434. A multichannel tuner may be provided for processing video and data to and from STB 405 and head end 410.

STB 405 may also include an operating system 422 for directing the functions of STB 405 in conjunction with a variety of client applications. For example, if a client application 425 requires a news flash from a third-party news source to be displayed on television 420, operating system 422 may cause the graphics functionality and video processor of STB 405, for example, to output the news flash to television 420 at the direction of client application 425 responsible for displaying news items.

Because a variety of different operating systems 422 may be utilized by a variety of different brands and types of set-top boxes, a middleware layer 424 may be provided to allow a given software application to be executed by a variety of different operating systems. According to an embodiment of the present invention, middleware layer 424 may include a set of application programming interfaces (API) that are exposed to client application 425 and operating system 422 that allow client application 425 to communicate with operating system 422 through common data calls understood via the API set. As described below, a corresponding middleware layer may be included on the server side of CATV system 400 for facilitating communication between server-side application server 440 and client-side STB 405. A middleware layer 442 of server-side application server 440 and middleware layer 424 of client-side STB 405 may format data passed between the client side and server side according to the Extensible Markup Language (XML). As should be appreciated, XML is only one example of data formatting, data passed between the client side and the server side may be formatted according to any other suitable formatting language or standard.

According to one embodiment, the set-top box 105 passes digital and analog video and data signaling to the television 120 via a one-way communication transport 134. STB 405 may pass digital and analog video and data signaling to the television 420 via communication transport 434. According to an embodiment, bidirectional communication may be accomplished between the STB 105 and the television 120. For example, high-definition multimedia interface (HDMI) ports on the STB 105 and television 120 allow for bidirectional data communications between the devices. STB 405 may receive video and data from the server side of CATV system 400 via access network 150 through a video/data downlink and data via a data downlink. STB 405 may transmit data from the client side of CATV system 400 to the server side of CATV system 400 via access network 150 via one data uplink. The video/data downlink may comprise an "in band" downlink that allows for digital and analog video and data signaling from the server side of CATV system 400 through access network 150 to set-top box 405 for use by STB 405 and for distribution to television set 420. The "in band" signaling space may operate at a variety of frequencies. According to one embodiment, the "in band" signaling space may operate at a frequency between 54 and 1000 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 4, between access network 150 and set-top box 405 may comprise "out of band" data links. The "out of band" frequency range generally lies between zero and 54 megahertz. Data flow between client-side set-top box 405 and server-side application server 440 is typically passed through the "out of band" data links. Alternatively, an "in band" data carousel may be positioned in an "in band" channel into which a data feed may be processed from server-side application server 440 through access network 150 to client-side STB 405. Operation of data transport between components of CATV system 400, described with reference to FIG. 4, is well known to those skilled in the art.

Data passed between CATV system 400 backend components such as head end 410 and CATV system 400 front end components such as STB 405 may be passed according to the Data Over Cable Service Interface Specification (DOCSIS). DOCSIS provides for a mechanism for data transport over a cable system such as CATV 400, illustrated in FIG. 4. Among other things, DOCSIS allows for the passing of digital communications and Internet connectivity over access network 150.

Referring still to FIG. 4, head end 410 of the CATV system 400 may be positioned on the server side of CATV system 400 and may include hardware and software systems responsible for originating and managing content for distributing through access network 150 to client-side STB 405 for presentation to customers via television 420. As described above, a number of services may be provided by CATV system 400, including digital and analog video programming, interactive television services, telephone services, video-on-demand services, targeted advertising, and provision of information content.

Application server 440 may comprise a general-purpose computing system operative to assemble and manage data sent to and received from client-side set-top box 405 via access network 150. As described above with reference to set-top box 405, application server 440 may comprise a middleware layer 442 for processing and preparing data from head end 410 of CATV system 400 for receipt and use by client-side set-top box 405. For example, application server 440 via the middleware layer 442 may obtain data from one and/or more of a plurality of third-party services 446 via network 150 for transmitting to a customer through access network 150 and set-top box 405. For example, a weather report from a third-party weather service may be downloaded by application server 440 via network 150. When application server 440 receives the downloaded weather report, middleware layer 442 may be utilized to format the weather report for receipt and use by set-top box 405. Data obtained and managed by middleware layer 442 of application server 440 may be formatted according to the Extensible Markup Language and may be passed to set-top box 405 through access network 150 where the XML-formatted data may be utilized by client application 425 in concert with middleware layer 424, as described above. A variety of third-party services 446 data, including news data, weather data, sports data and other information content may be obtained by application server 440 via distributed computing environments such as network 150 for provision to customers via access network 150 and set-top box 405.

According to embodiments of the present invention, the application server 440 may obtain customer profile data from services provider data services 460 (which may comprise an implementation of profile server 135) for preparing a customer profile that may be utilized by the set-top box 405 for tailoring certain content provided to the customer. According to embodiments of the present invention, a customer profile may include communications applications provisioned on networked STBs, as well as, designations of individual STBs in a home, business or facility (e.g., "kitchen STB," "bedroom STB," "office STB," and the like).

A plurality of provider data services 460 may include a number of services operated by the services provider of CATV system 400 that may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. A customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising data services 460 may operate as separate data services systems, which communicate with a web services system (described below) along a number of different communication paths and according to a number of different communication protocols.

Referring still to FIG. 4, a web services system 450 is illustrated between application server 440 and data services 460. Web services system 450 may serve as a collection point for data requested from each of the disparate data services systems comprising data services 460. When application server 440 requires customer profile data from one or more of data services 460 for preparation or update of a customer profile, application server 440 passes a data query to web services system 450. Web services system 450 formulates a data query to each of the available data services systems for obtaining any available data for a given customer as identified by a set-top box identification associated with the customer. Web services system 450 may serve as an abstraction layer between the various data services systems and application server 440. That is, application server 440 is not required to communicate with the disparate data services systems, nor is application server 440 required to understand the data structures or data types utilized by the disparate data services systems. Web services system 450 may be operative to communicate with each of the disparate data services systems for obtaining necessary customer profile data. The customer profile data obtained by the web services system is assembled and is returned to application server 440 for ultimate processing via middleware layer 442, as described above.

An embodiment consistent with the invention may comprise a system for providing content stream management. The system may comprise a memory storage and a processing unit coupled to the memory storage. The processing unit may be operative to receive a request from a client for a content element, select a version of the content element, transmit the content element in the selected version to the client, periodically determine whether a second version of the content element should be transmitted to the client, and, if so, transmit the content element in the second version to the client.

Another embodiment consistent with the invention may comprise a system for providing dynamic content stream management. The system may comprise a memory storage and a processing unit coupled to the memory storage. The processing unit may be operative to receive a request for a content element from a client device, select an encoding scheme for the content element, transmit the requested content element to the client device in the selected encoding scheme, and determine, during transmission of the requested content element, whether to switch to a second encoding scheme for the requested content element according to at least one rule. If the second encoding scheme is needed, the processing unit may be operative to begin transmission of the requested content element to the client device in the second encoding scheme. The switch in transmission from the first content stream to the second may occur at an alignment point associated with the content element. The alignment point may comprise a time within the content element at which the first and second content streams are displaying substantially the same frame. For example, a first stream may comprise an MPEG-2 encoding scheme and a second stream may comprise an MPEG-4 encoding scheme, each of which utilize encoded I, B, and P frames as described above with respect to FIG. 2. An alignment point associated with the two streams may comprise a point at which both streams have encoded substantially the same I-frame. The alignment points associated with each encoded stream may be formatted as metadata associated with the stream and retrieved and/or read by, for example, content streaming platform 140 and/or resource manager 160. In response to determining to switch to a different encoding scheme for one client device, the processing unit may be further operative to switch a plurality of other client devices to a different encoding scheme. For example, several client devices may be receiving high bit rate encoded streams of the same content element when a rule comprising a network congestion condition triggers a switch to a lower bit rate encoded stream for at least one of the client devices. The determination may be based in part on a determination that the particular content element is a lower priority for high bit rate encoding than other content elements being transmitted, and so others of the client devices may also be switched to the lower bit rate encoded stream at the same time. This may help conserve network resources for a higher priority content element.

Yet another embodiment consistent with the invention may comprise a system for providing dynamic content stream management. The system may comprise a memory storage and a processing unit coupled to the memory storage. The processing unit may be operative to receive a content element request from at least one client, apply at least one first rule of a plurality of rules, wherein each of the plurality of rules comprises a condition associated with the selection of an encoding scheme, select a first encoding scheme for the content element, deliver the requested content element to the at least one client as a first content stream encoded according to the first encoding scheme, and apply at least one second rule of the plurality of rules during delivery of the first content stream to the at least one client.

The rule condition may comprise, for example, a client subscription tier, a network latency, a network bandwidth availability, a content classification, a time of day, a number of requests for the content stream, a resource utilization threshold, a resource utilization change, a client device compatibility, a client device change, an event occurrence, a number of requesting client devices, a grading of the content element, and a content type. The client subscription tier condition may comprise a characteristic associated with the requesting client entitling that client to a higher quality/bit rate stream than other clients associated with different subscription tiers. Network latency and/or bandwidth characteristics may be evaluated so that higher bit rate streams may be transmitted when there exists greater network resource availability and medium and/or lower bit rate streams may be transmitted to ease network congestion and ensure content streams are not interrupted and/or distorted during times of less network resource availability. Network characteristics may be determined according to various methods such as round trip ping times, bandwidth tests, provisioning (e.g., stored information associated with a requesting client), and/or packet error/loss reporting. For example, a client device may be operative to report to a headend a rate and/or number of missing and/or corrupted content stream packets.

Content grading and types may be used to select bit rates appropriate to the content. For example, a shopping channel stream may be graded low and thus may more often result in selection of a lower bit rate encoding while premium movie channel content and/or video on demand content may be graded high and thus receive higher priority in transmitting high bit rate streams. Similarly, an event occurrence such as a severe weather alert may result in news type content receiving higher priority for transmission in high bit rate quality.

The processing unit may be further operative to detect that the condition associated with the a rule has occurred, select a second encoding scheme for the requested content element according to the rule, and initiate delivery of the content element in the second encoding stream instead of the first encoding scheme. To initiate delivery of the content element in the second encoding scheme, the processing unit may be operative to align the first content stream encoded according to the first encoding scheme with a second content stream encoded according to the second encoding scheme, begin delivery of the second content stream at an alignment point of the content element, and cease delivery of the first content stream at the alignment point of the content element.

Figure 5:
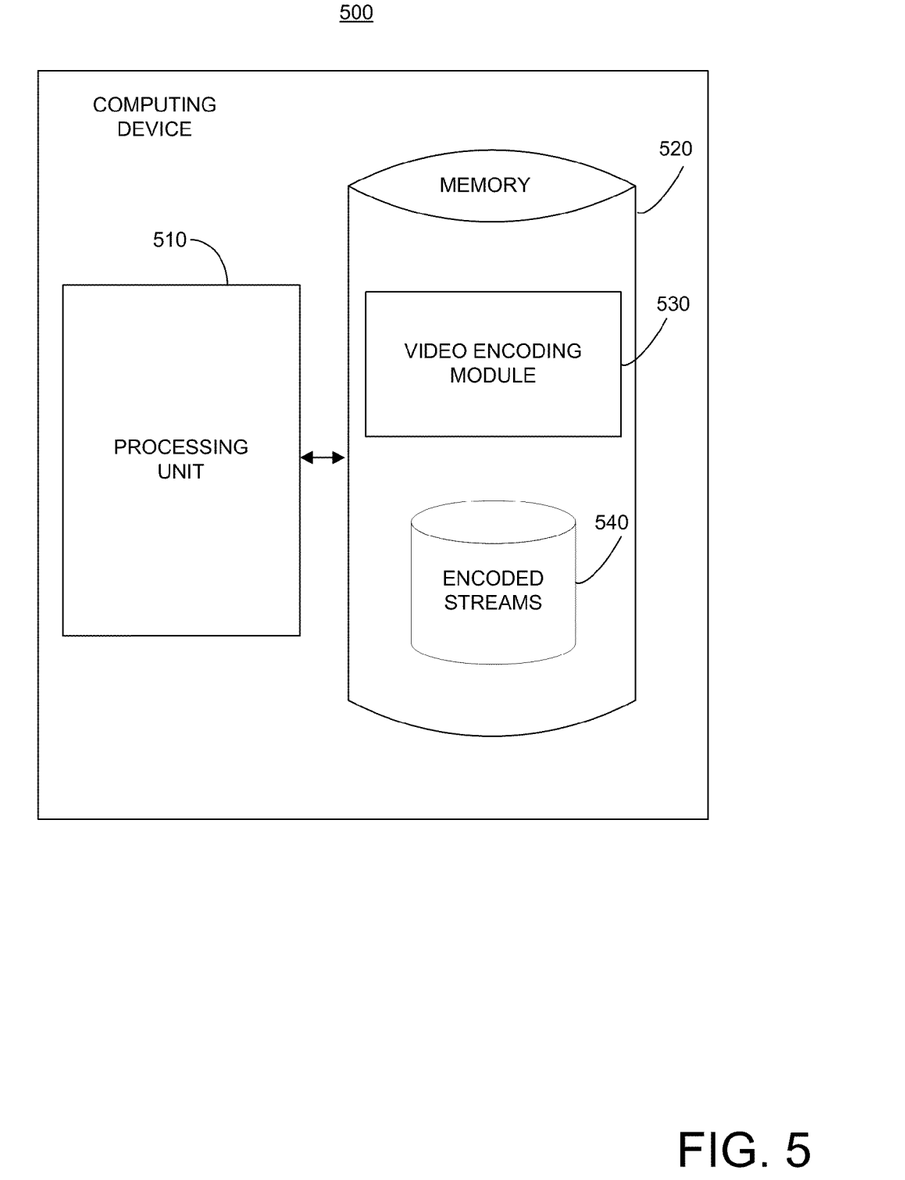
FIG. 5 is a block diagram of a computing device.

FIG. 5 illustrates a computing device 500 as configured to execute profile server 135. Computing device 500 may include a processing unit 510 and a memory unit 520. Memory 520 may include a video encoding software module 530 and an encoded content streams data store 540. While executing on processing unit 510, encoding software module 530 may perform processes for retrieving, updating, and/or transmitting profile information, including, for example, one or more stages included in method 300 described above with respect to FIG. 3. Furthermore, encoding software module 530 may be executed on or reside in any element shown and/or described with respect to FIG. 1. Moreover, any one or more of the stages included in method 300 may be performed on any element shown in FIG. 1.

Computing device 500 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

As described herein, methods and systems are provided for dynamically managing content streams such that appropriate versions of the same content may be transmitted based on changing conditions. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing content stream management, the method comprising:
   receiving a request from a client for a content element;
   selecting a version of the content element, wherein selecting the version of the content element comprises selecting an encoding scheme and encoding the content element according to the encoding scheme prior to the content element being transmitted to the requesting client, wherein the encoding scheme specifies a first group of pictures interval comprising a number of Intra-coded frames and Predictive-coded frames in a first ratio for providing the content element;
   transmitting the content element in the selected version to the client;
   periodically determining whether a second version of the content element, encoded according to a new encoding scheme, should be transmitted to the client, wherein the selected version of the content element and the second version of the content element each includes metadata that stores a plurality of associated alignment points, each of the alignment points being at a time location within the content element at which the selected version of the content element and the second version of the content element are synchronized, wherein the new encoding scheme specifies a second group of pictures interval comprising a different ratio of Intra-coded frames and Predictive-coded frames for providing the content element; and in response to determining that the second version of the content element should be transmitted, transmitting the second version of the content element to the client.

2. The method of claim 1, wherein the version of the content element is selected from a plurality of pre-encoded versions of the content element.

3. The method of claim 1, wherein periodically determining whether the second version of the content element should be transmitted to the client comprises detecting a change in a resource utilization.

4. The method of claim 3, wherein detecting the change in the resource utilization comprises detecting at least one of the following: a change in a number of content elements being transmitted, a change in a network latency, a change in a capability of the client, a change in a number of clients requesting the content element, and a change in available network bandwidth.

5. The method of claim 1, wherein periodically determining whether the second version of the content element should be transmitted to the client comprises receiving an event notification associated with the content element.

6. The method of claim 1, wherein selecting the version of the content element comprises selecting the version of the content element compatible with the client.

7. The method of claim 1, wherein selecting the version of the content element comprises selecting the version of the content element according to at least one network characteristic.

8. The method of claim 1, wherein the encoding scheme is one of, and the new encoding scheme is a different one of:
a CCIR 601 encoding scheme;
an MPEG-1 encoding scheme;
an MPEG-2 encoding scheme;
an MPEG-4 encoding scheme;
an H.261 encoding scheme;
an H.263 encoding scheme;
an H.264 encoding scheme; and
a Theora encoding scheme.

9. The method of claim 1, wherein the content element is encoded into a plurality of group of pictures interval, wherein each group of pictures interval of the plurality of group of pictures interval comprises:
one intra-coded frame, comprising a compressed version of a single raw frame of the content element, wherein the intra-coded frame is a first frame in each group of pictures interval of the plurality of group of pictures intervals;
a plurality of predictive-coded frames, wherein a given predictive-coded frame of the plurality of predictive-coded frames encodes a motion vector of a macroblock from a reference frame preceding the given predictive-coded frame; and
wherein each of the alignment points correspond to intra-coded frames.

10. A system for providing dynamic content management, the system comprising:
a memory storage; and
a processing unit coupled to the memory storage, wherein the processing unit is operative to:
receive a request from a client for a content element;
select a version of the content element, wherein selecting the version of the content element comprises selecting an encoding scheme and encoding the content element according to the encoding scheme prior to the content element being transmitted to the requesting client, wherein the encoding scheme specifies a first group of pictures interval comprising a number of Intra-coded frames and Predictive-coded frames in a first ratio for providing the content element;
transmit the content element in the selected version to the client;
determine whether a second version of the content element, encoded according to a new encoding scheme, should be transmitted to the client, wherein the selected version of the content element and the second version of the content element each includes metadata that stores a plurality of associated alignment points, each of the alignment points being at a time location within the content element at which the selected version of the content element and the second version of the content element are synchronized, wherein the new encoding scheme specifies a second group of pictures interval comprising a different ratio of Intra-coded frames and Predictive-coded frames for providing the content element; and
in response to determining that the second version of the content element should be transmitted, transmit the second version of the content element to the client.

11. The system of claim 10, wherein the version of the content element is selected from a plurality of pre-encoded versions of the content element.

12. The system of claim 10, wherein being operative to determine whether the second version of the content element should be transmitted to the client comprises being operative to detect a change in a resource utilization.

13. The system of claim 12, wherein being operative to detect the change in the resource utilization comprises being operative to detect at least one of the following: a change in a number of content elements being transmitted, a change in a network latency, a change in a capability of the client, a change in a number of clients requesting the content element, and a change in available network bandwidth.

14. The system of claim 10, wherein being operative to determine whether the second version of the content element should be transmitted to the client comprises being operative to receive an event notification associated with the content element.

15. The system of claim 10, wherein being operative to select the version of the content element comprises being operative to select the version of the content element compatible with the client.

16. The system of claim 10, wherein being operative to select the version of the content element comprises being operative to select the version of the content element according to at least one network characteristic.

17. The system of claim 10, wherein the encoding scheme is one of, and the new encoding scheme is a different one of:
a CCIR 601 encoding scheme;
an MPEG-1 encoding scheme;
an MPEG-2 encoding scheme;
an MPEG-4 encoding scheme;

an H.261 encoding scheme;
an H.263 encoding scheme;
an H.264 encoding scheme; and
a Theora encoding scheme.

18. The system of claim 10, wherein the content element is encoded into a plurality of group of pictures interval, wherein each group of pictures interval of the plurality of group of pictures interval comprises:
- one intra-coded frame, comprising a compressed version of a single raw frame of the content element, wherein the intra-coded frame is a first frame in each group of pictures interval of the plurality of group of pictures intervals;
- a plurality of predictive-coded frames, wherein a given predictive-coded frame of the plurality of predictive-coded frames encodes a motion vector of a macroblock from a reference frame preceding the given predictive-coded frame; and
- wherein each of the alignment points correspond to intra-coded frames.

19. A method of providing content stream management, the method comprising:
- receiving a request from a client for a content element;
- selecting a version of the content element, wherein selecting the version of the content element comprises selecting an encoding scheme and encoding the content element according to the encoding scheme prior to the content element being transmitted to the requesting client, wherein the encoding scheme specifies a first group of pictures interval comprising a number of Intra-coded frames and Predictive-coded frames in a first ratio for providing the content element;
- transmitting the content element in the selected version to the client;
- receive an event notification associated with the content element;
- in response to the event notification, determining whether a second version of the content element, encoded according to a new encoding scheme, should be transmitted to the client, wherein the selected version of the content element and the second version of the content element each includes metadata that stores a plurality of associated alignment points, each of the alignment points being at a time location within the content element at which the selected version of the content element and the second version of the content element are synchronized, wherein the new encoding scheme specifies a second group of pictures interval comprising a different ratio of Intra-coded frames and Predictive-coded frames for providing the content element; and
- in response to determining that the second version of the content element should be transmitted, transmitting the second version of the content element to the client.

20. The method of claim 1, wherein the version of the content element is selected from a plurality of pre-encoded versions of the content element.

* * * * *